United States Patent Office 3,429,761
Patented Feb. 25, 1969

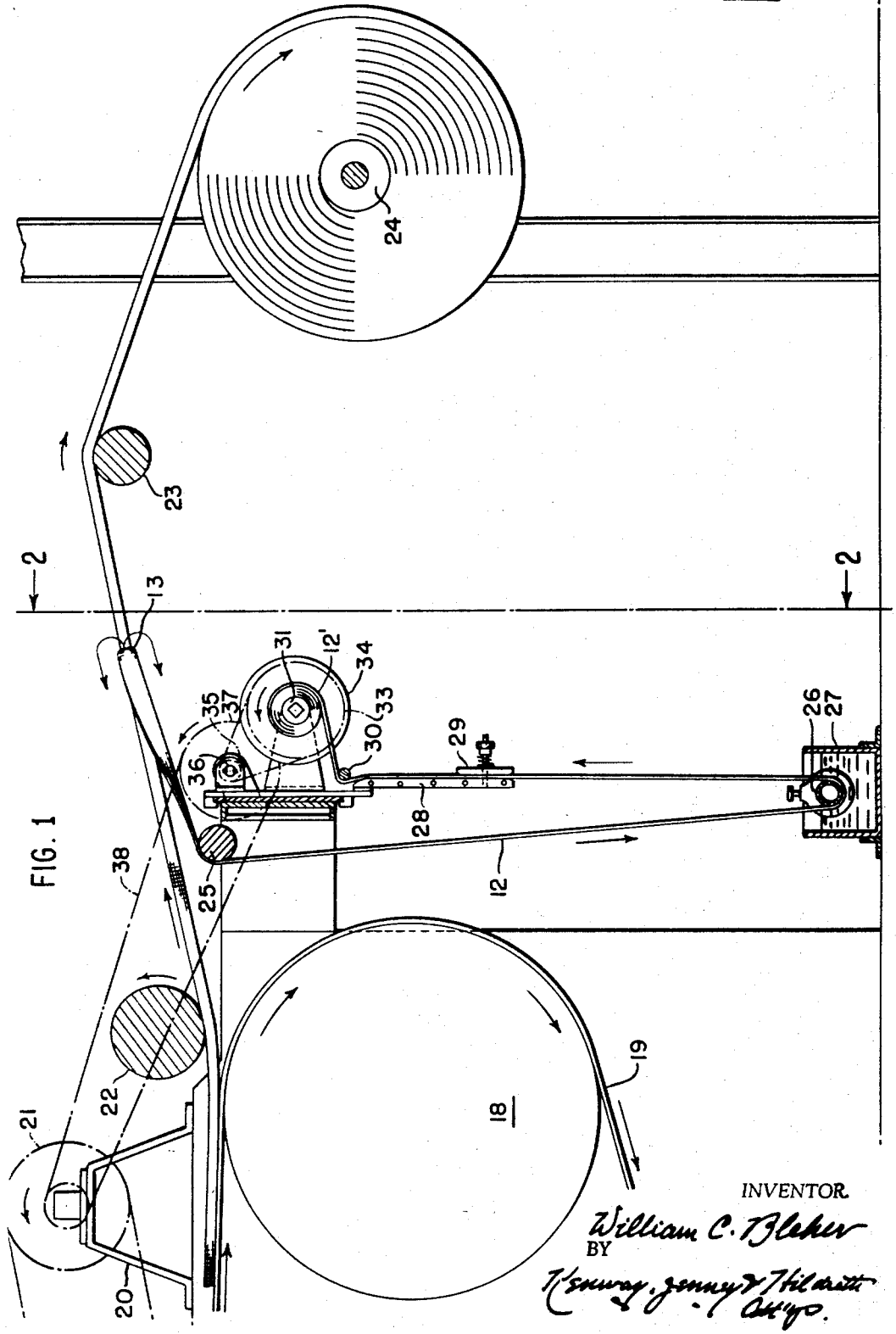

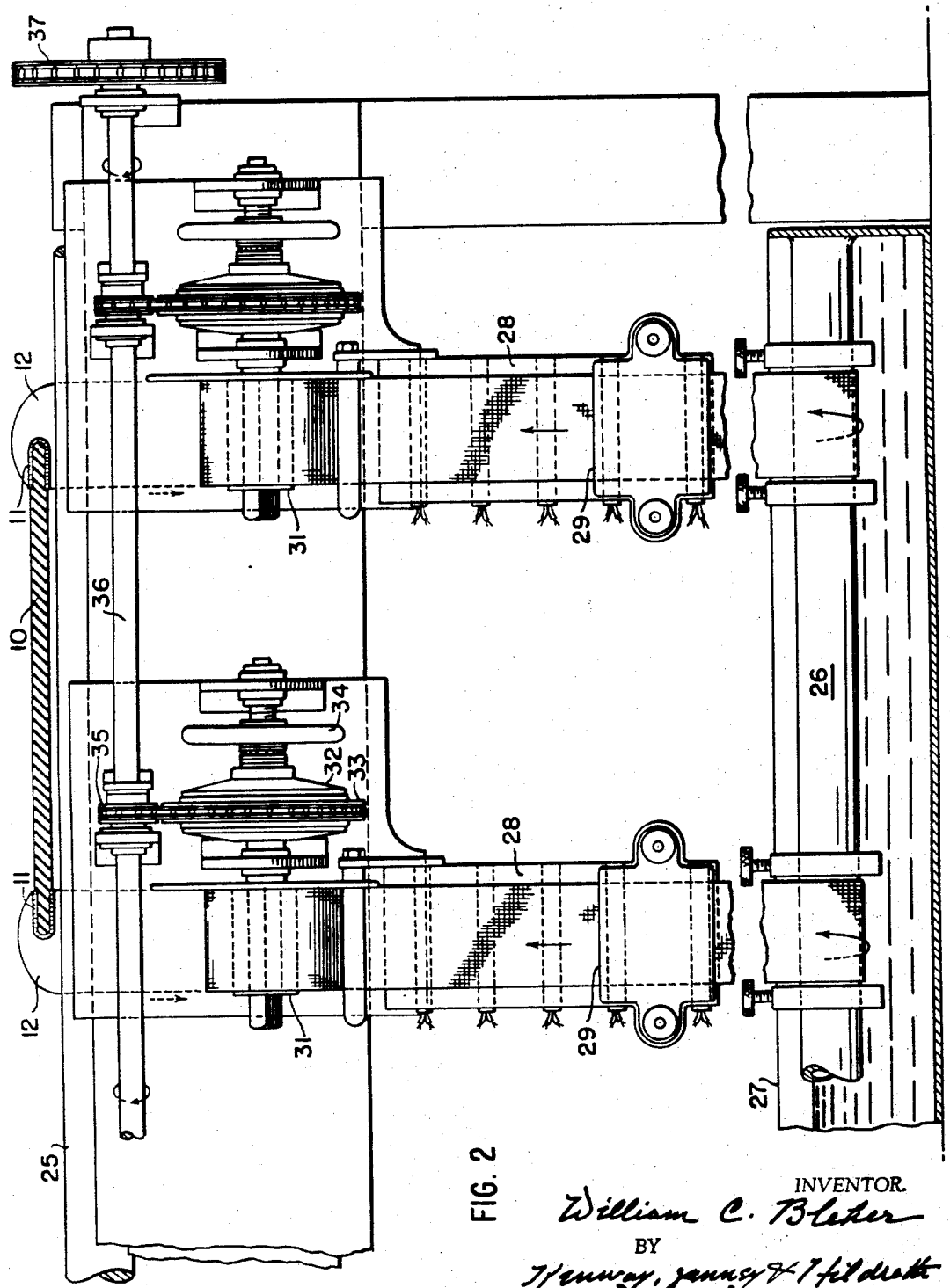

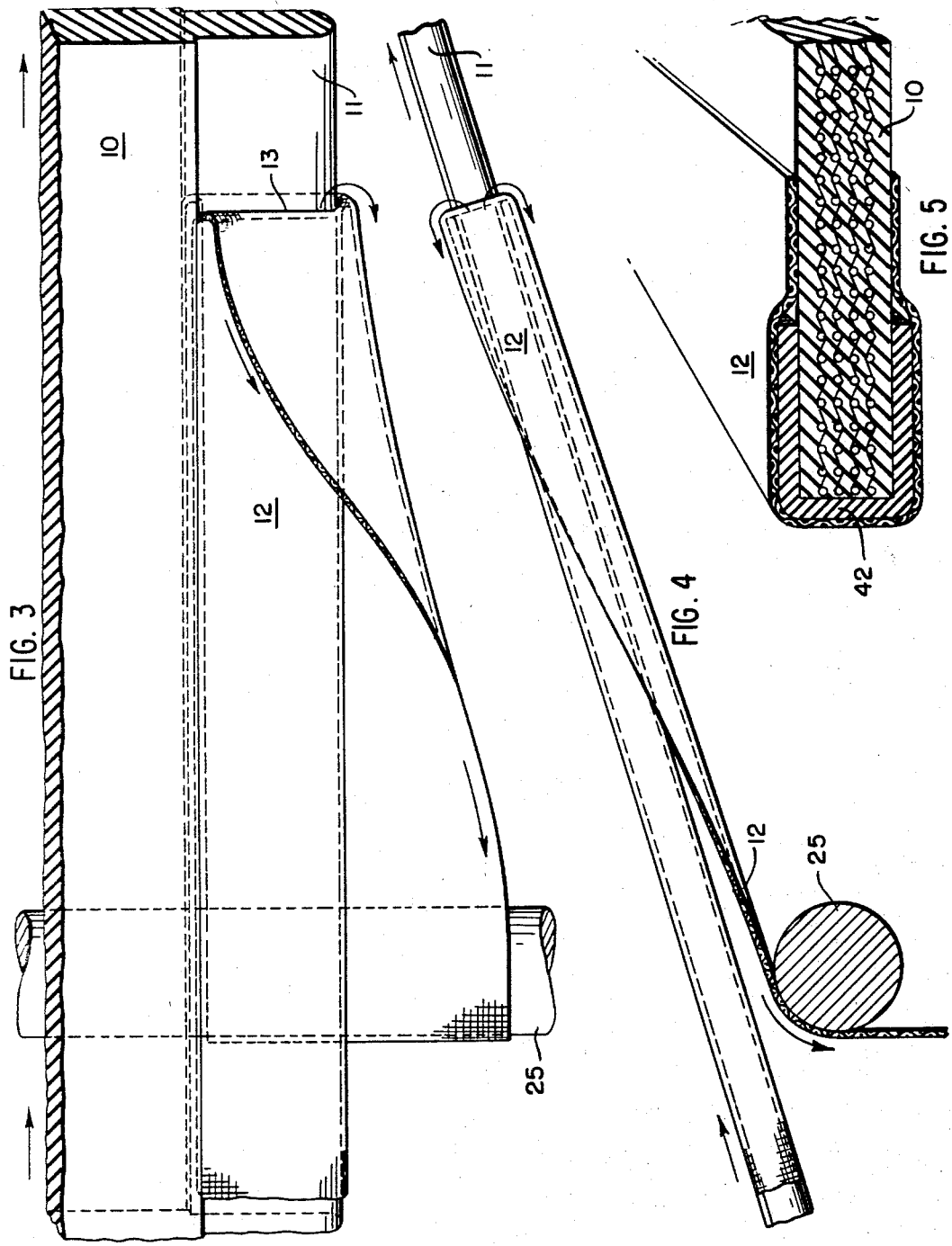

3,429,761
TAPE RECLAIMING DEVICE AND PROCESS
William C. Bleher, West Roxbury, Mass., assignor to American Biltrite Rubber Co., Inc., Chelsea, Mass., a corporation of Delaware
Filed Apr. 2, 1965, Ser. No. 445,178
U.S. Cl. 156—247      10 Claims
Int. Cl. B32b 35/00

ABSTRACT OF THE DISCLOSURE

Process and apparatus for reclaiming for reuse tape adhesively attached to elastomeric belting characterized by the steps of stiffening a section of flexible tape-carrying belting, forming a transverse fold vertex in the tape at a point in the stiffened section of the belting and stripping the tape from the belting at the vertex so formed.

---

This invention comprises a new and improved process of and apparatus for reclaiming for reuse the tape used temporarily in the manufacture of elastomeric belting of rounded edge structure.

The field of the present invention is described in United States Letters Patent No. 3,041,661 Elliott wherein is disclosed a process of continuously producing round-edge belting in which a flat ribbon or tape of sheet material is folded about the opposite edges of the uncured belting, and progressively adhesively secured to the flat faces of the belting while being formed to present a bight of semi-circular cross section extending longitudinally along each edge. The belting thus equipped is then progressively heated and molded, causing its elastomeric material to flow and fill the bight of the tape and form an integral round edge upon the belting.

The ribbon or tape is preferably of nylon or other tough flexible fabric which, for reasons of economy, it is important to recover and reclaim for repeated use. The present invention constitutes a solution of this problem.

In one aspect the process of this invention is characterized by the steps of stiffening by tension or otherwise a moving section of flexible tape-carrying belting conformed to a straight-line path in free open space forming a fold vertex in the tape at a freely accessible point in the stiffened and moving section of the belting, and feeding the belting and tape in opposite directions from this fold vertex.

Having separated the tape from the belting the tape may now be subjected to secondary treatment, such as moistening and ironing to restore it to smooth flat condition in readiness to be applied to a fresh length of uncured belting.

The process of the invention will be best understood and appreciated from the following description of a preferred procedure of carrying it out, together with one form of apparatus that may be advantageously employed for that purpose, all as shown in the accompanying drawings, in which:

FIG. 1 is a view in elevation of the apparatus in side elevation,

FIG. 2 is a corresponding view in front elevation showing the tape in cross section, FIGS. 3 and 4 are fragmentary views of the belting on a larger scale, and FIG. 5 is a fragmentary view suggesting an additional step in the process.

The belting 10 herein shown may be typical flexible conveyor belting composed of a carcass made from plies of woven textile fabric, contained between top and bottom plies of elastomeric materials such as rubber or vinyl compounds. The various compounds are molded and cured by passing between cooperating surfaces, such for example as the drum and pressure band of the well known "Rotocure" machine or the platens of a flat press. The roll 18 and band 19 shown in FIG. 1 are parts of the "Rotocure" machine.

The edges of the belting are conformed and molded during the curing operation by tapes 12 which are adhesively secured to the opposite flat faces of the belting as above explained in inwardly concave channel formations with the result that the side edges of the belting emerge with molded rounded edges 11.

In leaving the "Rotocure" machine, or the platens of a flat press, the belting with its attached tapes is passed under guide roll 22 over a guide roll 23 and thence, unsupported and moving in free space in a straight line path determined by these two rolls to a driven reel 24. The action of the reel 24 is to advance the section of the belting between the two guide rolls 22 and 23 under substantial tension that maintains the otherwise flexible section in stiff condition and in a straight-line path.

At any convenient point in this stiffened section of the belting a transverse fold vertex 13 is formed in the tape 12 by reversing its inward channel formation and stripping it rearwardly or in a direction counter to that of the belt travel in free open space. At the vertex 13 the belting is still hot from the curing step and the stripping operation thus facilitated.

The stripped tape is passed about a guide roller 25 located beneath the belting and adjacent to its stiffened section. After passing this roll the stripped tape is directed downwardly to a tank 27 containing a moistening or sizing liquid in which the tape is immersed by passing around a guide roll 26. The tape is then directed upwardly and passed over a hot plate 28 and beneath an adjustable presser member 29 which smooths the moistened tape and irons it into flat condition. The flattened tape is then passed about a guide roll 30 and led to a driven reel 31 upon which it is formed into a coil 12'.

The reel 31 is secured to a shaft carrying a friction clutch 32 and a sprocket wheel 33. The action of the friction clutch is controlled by a hand wheel 34 and driven by a sprocket wheel 35 through a sprocket chain. The sprocket wheel 35 is keyed upon a transverse shaft 36 which carries at one end a large sprocket wheel 37 and this in turn is driven through a belt 38 by a motor 21 mounted upon a bracket 20 on the machine frame.

The shaft 36 extends transversely beneath and across the belting 10 and carries duplicate sets of mechanism for handling the tape carried by both edges of the belting. The reels 31 are driven so as to take up the tape at the same linear speed as the travel of the belting between the guide rolls 22 and 23 with the result that the fold vertex 13 of the tape tends to remain at approximately the same point at all times.

As shown in FIGS. 3 and 4 the tape 12 is secured directly to the belting. In many cases however it has been found desirable to utilize the tape as a carrier for additional elastomeric material to be supplied to the edges of the belting and molded into rounded shape thereon by the action of the tape. This is suggested in FIG. 5 where the tape 12 is shown as carrying a ribbon 42 of uncured or partially cured rubber or vinyl compound in position to be incorporated in the edge of the belting and remains as a rounded integral part thereof after the tape 12 is removed by the process above outlined.

In those cases where additional elastomeric material is supplied, as by the ribbon 42, the side edges of the belting are usually trimmed so as to expose the fabric of the carcass for direct engagement with the ribbon. When the tape 12 is of coarse weave its threads become embedded in the surface of the belting thus intensifying its adhesive bond to the belting but still subject for stripping and removal as above described.

Having thus disclosed my invention and described in detail an illustrative example of its practice, I claim as new and desire to secure by Letters Patent:

1. The process of reclaiming for reuse tape adhesively attached to the edge of flexible elastomeric belting, comprising the steps of continuously advancing tape-carrying belting in free open space while a section thereof is held under tension in a straight line path, turning the advancing end of the tape inside out at a point in said straight path where the tape is fully accessible, stripping it from the belting and feeding the stripped tape in a direction counter to that of the belting and at substantially the same rate as the travel of the belting.

2. The process of claim 1 further characterized by the additional steps of progressively moistening the stripped tape, ironing the moistened tape and then coiling it.

3. The process of reclaiming for reuse tape adhesively attached to elastomeric belting, comprising the steps of stiffening a section of flexible tape-carrying belting while traveling in free open space, forming a transverse fold vertex in the tape at a point in the stiffened section of the belting, and feeding the belting and tape in opposite directions from said fold vertex.

4. The process of continuously vulcanizing rubberized belting with an adhesively attached edge-forming tape, stiffening a section of the belting while traveling in free open space, stripping the tape from the stiffened section of the belting at the conclusion of the vulcanizing step while the belting is still hot, and then flattening, cooling and coiling the stripped tape.

5. The process of reclaiming for reuse a textile tape which is adhesively attached in inwardly concave formation to one edge of flexible elastomeric belting, comprising the steps of stiffening a length of tape-carrying belting while traveling in free open space, and at a point in said stiffened section reversing the tape into an outwardly concave formation, and continuously feeding the tape away from the belting at the said point of reversal.

6. Apparatus for reclaiming for reuse tape adhesively attached to flexible elastomeric belting, comprising rolls for confining a section of tape-carrying belting in straight-line stiff condition while traveling in free open space, feed rolls for stripping attached tape from the belting at a point in said straight-line section, means for moistening the stripped tape, means for flattening the moistened tape, and constant-tension means for coiling the flattened tape.

7. Apparatus for reclaiming for reuse tape adhesively attached to flexible elastomeric belting, comprising spaced guide rolls, belt feeding means for advancing a section of tape-carrying belting in stiffened, straight-line path between said guide rolls, a guide member adjacent to the belting in its said straight-line path, means for continuously stripping and feeding the tape from the belting and over said guide member in a direction reverse of that in which the belting is fed and means for regulating the rate of tape feeding.

8. Apparatus as described in claim 7, further characterized by the addition of a moistening tank and means for progressively immersing the stripped tape therein.

9. Apparatus as described in claim 7, further characterized by the addition of means for ironing and coiling the stripped tape.

10. In the manufacture of flexible elastomeric round-edge belting, the steps of securing to an edge of uncured belting a fabric tape carrying a ribbon of elastomeric material which is pressed against the edge of the belting, adhesively attaching the fabric tape to the flat faces of the belting thereby enclosing said ribbon, curing the belting while thus equipped with said ribbon and tape, and then stiffening a section of the otherwise flexible belting and stripping the tape from the belting for reuse while traveling in free open space and leaving the material of the ribbon as an integral part of the cured belting.

References Cited

UNITED STATES PATENTS

| 2,894,868 | 7/1959 | Hyde | 156—344 |
| 3,041,661 | 7/1962 | Elliott | 264—284 |

EARL M. BERGERT, *Primary Examiner.*

M. L. KATZ, *Assistant Examiner.*

U.S. Cl. X.R.

156—344, 584; 38—17